Nov. 24, 1964       H. B. HENDERSON            3,158,234
         AUTOMATIC ADJUSTING DEVICES FOR DISC BRAKES
Filed April 4, 1963                          3 Sheets-Sheet 1

INVENTOR
Henry B. Henderson
BY
Lawrence J. Winter
ATTORNEY

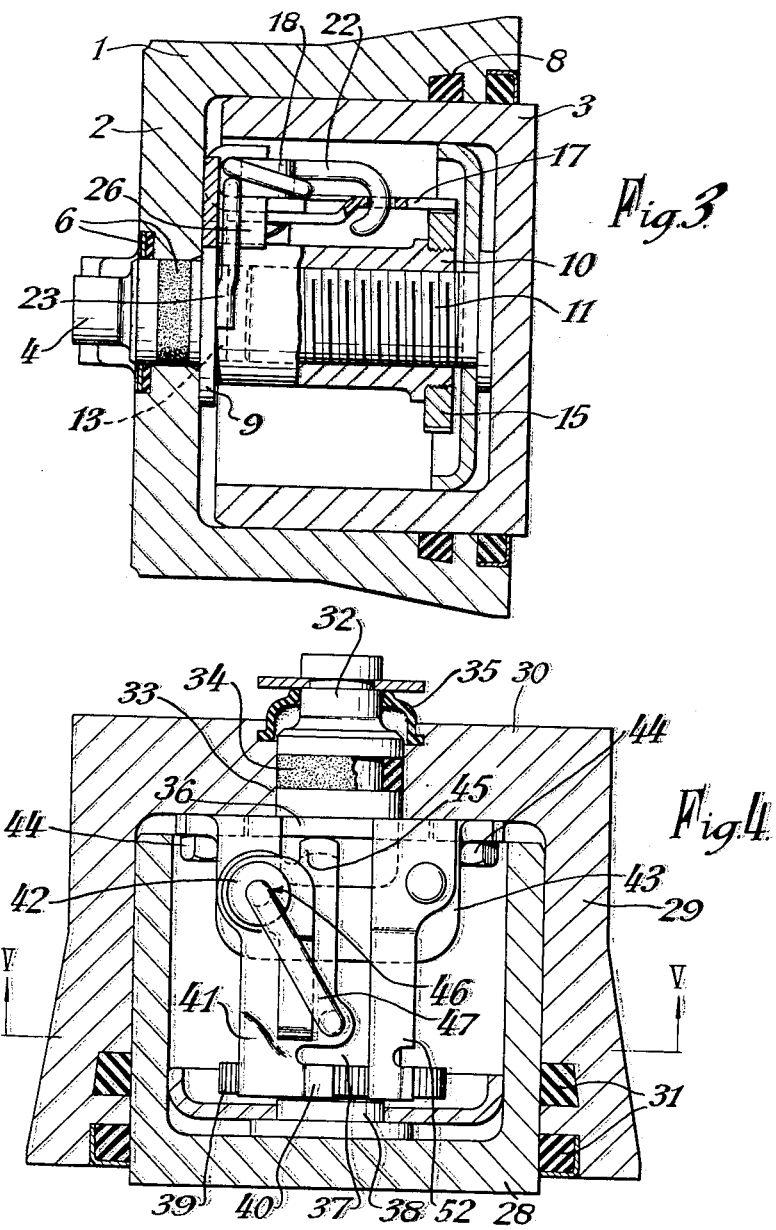

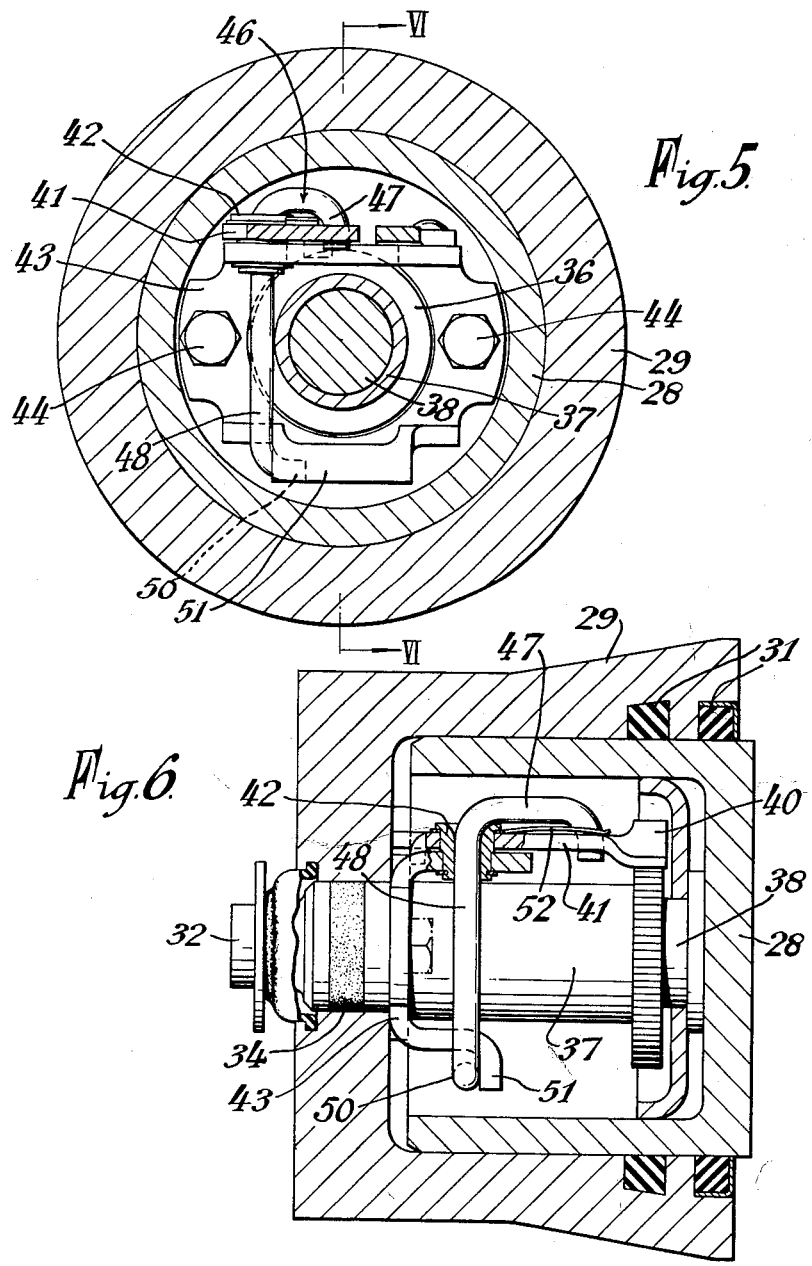

United States Patent Office 3,158,234
Patented Nov. 24, 1964

3,158,234
AUTOMATIC ADJUSTING DEVICES FOR DISC BRAKES
Henry B. Henderson, Leamington Spa, England, assignor to Automotive Products Company Limited, Leamington Spa, England
Filed Apr. 4, 1963, Ser. No. 270,651
Claims priority, application Great Britain, Apr. 6, 1962, 13,361/62
5 Claims. (Cl. 188—196)

This invention relates to an adjusting device for disc brakes, operable automatically to effect adjustment of the brake to compensate for wear of the brake pads.

According to the invention an automatic adjusting device for disc brakes comprises a thrust member operable by brake actuating means to apply a brake pad to the brake disc, members having interengaging threads, interposed between the thrust member and the brake pad and pawl and ratchet means operable by said thrust member to effect rotation of one of said members relative to the other to vary the effective length thereof in dependence upon the wear of the brake pads. The device may for example, consist of a push rod mounted so as to be slidable from a retracted position towards the brake pad on one side of a brake disc, a pair of members arranged co-axially with the push rod and interposed between the push rod and the brake pad so as to be movable jointly with the push rod to transmit the thrust to the brake pad, said members consisting of a sleeve having a threaded bore to receive a correspondingly threaded rod, a ratchet wheel carried by or formed on said sleeve and a spring loaded driving pawl engageable with the teeth of said ratchet wheel, said driving pawl being operable against the spring action by movement of the push rod from the retracted position, providing sufficient wear of the brake pads has occurred, to engage a further tooth and upon return movement of said push rod to the retracted position to rotate the ratchet wheel under the spring action to cause relative movement between the sleeve and threaded rod whereby the former is moved axially inwardly to close any gap between the adjacent opposite ends of the push rod and sleeve upon the return movement of the push rod as the brakes are released and thereby compensate for the wear of the brake pads.

The adjusting device of the present invention is particularly suitable for incorporation in a fluid pressure operated disc brake adapted for mechanical operation so that the same can be used as a hand brake, the adjusting device being arranged so as to be operable to effect a brake adjustment only upon actuation of the hand brake. Forms of the adjusting device for a hydraulic disc brake of this kind will therefore be described by way of example by aid of the accompanying drawings in which:

FIGURE 3 is a section on the line III—III of FIGURE 2;

FIGURE 4 is a section similar to FIGURE 1 but showing a modified construction of the adjuster mechanism;

FIGURE 5 is a section on the line V—V of FIGURE 4; and

FIGURE 6 is a section on the line VI—VI of FIGURE 5.

Figure 1:
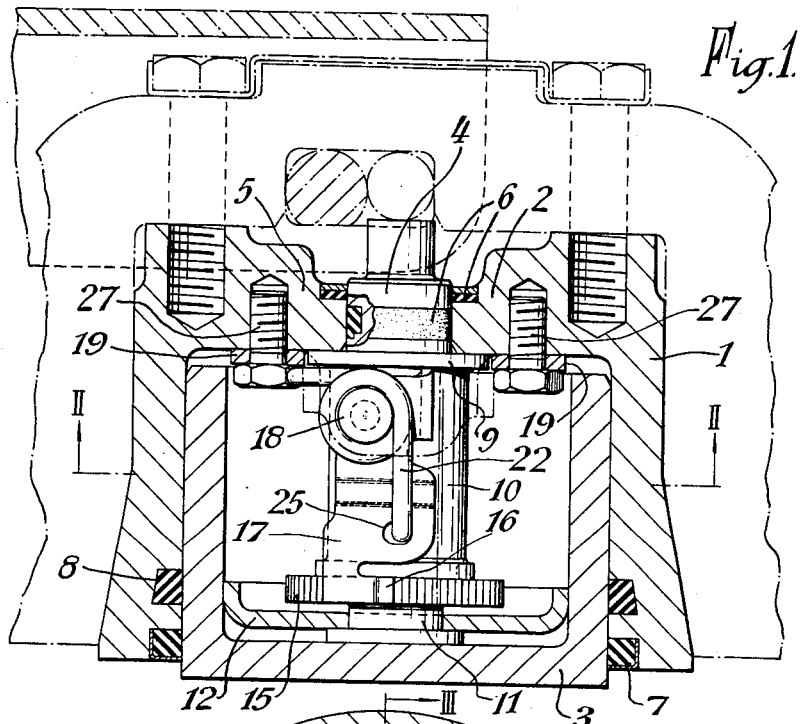
FIGURE 1 is a view showing in section the hydraulic cylinder of the brake.
Figure 2:
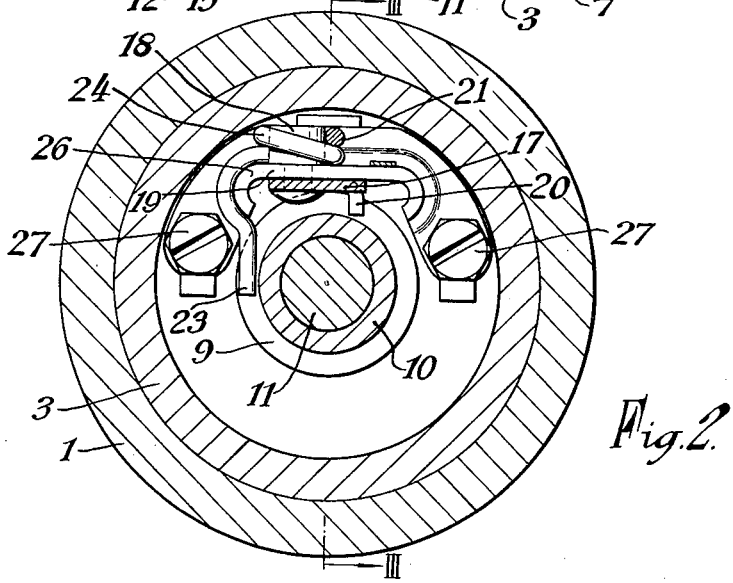
FIGURE 2 is a section on the line II—II of FIGURE 1.

Referring to the drawings, particularly FIGURES 1 to 3 the wheel cylinder of the disc brake comprises a hydraulic cylinder 1 closed at one end by an end wall 2, the cylinder containing a piston 3 operable by the admission of hydraulic liquid to the hydraulic cylinder to apply a brake pad or pads to the brake disc to effect a normal braking operation, the piston also being operable mechanically to apply the brakes upon actuation of the hand brake. With the present form of the invention the adjusting device is disposed within the wheel cylinder for which purpose a hollow cylindrical piston 3 is used which is closed at one end, the piston being assembled in the hydraulic cylinder closed end outermost, so that the interior of the piston provides a recess to receive the adjusting device. Mechanical operation of the piston is effected through a push rod 4 adapted to be operatively connected by a suitable linkage to the hand brake lever. The push rod 4 is disposed co-axially with the piston and is slidably mounted in a guide 5 extending outwardly from the closed end of the hydraulic cylinder, the inner end of the push rod extending into the cylinder, while the outer end projects out of the guide and is adapted for connection to actuating means operatively associated with the hand brake lever. Seals 6 are provided to prevent leakage of hydraulic liquid along the push rod. Seals 7 and 8 are also provided in the usual manner between the bore of the hydraulic cylinder 1 and the piston 3.

The inner end of the push rod has an enlarged head 9 which abuts the inner face of the closed end wall 2 of the hydraulic cylinder to limit the outward movement of the push rod 4 when in its retracted position. The adjusting device includes a pair of members consisting of a sleeve 10 having a threaded bore which receives a correspondingly threaded rod 11. The sleeve and threaded rod are arranged in the interior of the piston, co-axially with the push rod 4 and extend between the enlarged head 9 of the push rod 4 and the inner face of the closed end of the piston. Axial support for the sleeve and threaded rod is provided for by passing the outer end of the threaded rod 11 through a hole in a disc 12 secured within the interior of the piston 3, the opposite end of the sleeve 10 passing over a protuberance or projection 13 (see FIG. 3) formed on the inner end of the push rod 4. The end of the sleeve 10 adjacent the closed end of the piston carries a ratchet wheel 15, the teeth of which are engageable by a driving pawl 16 which is disposed at one end of an arm 17. Arm 17 is pivotally mounted about its other end on a pivot pin 18. Pin 18 is carried by a bracket 19 supported by the wheel cylinder so as to be located within the interior of the piston. The bracket is secured by bolts 27 to the inner surface of the closed end of the cylinder 1. The pivot pin 18 is arranged at right angles to the axis of the cylinder so that the arm 17, which extends parallel to said axis, is swingable in a plane parallel to said cylinder axis. The arm 17, adjacent its pivoted end has a abutment or stop member 20 (FIGURE 2) which is positioned in the path of movement of the enlarged head 9 of the push rod so as to be engaged thereby as the push rod slides inwardly, such engagement turning the arm in the clockwise direction (FIGURE 1) against spring loading the action of which normally biases the arm in the driving direction of the ratchet wheel.

In order to provide a simple construction of adjusting device which can be accommodated in the limited space available in the interior of the piston of the hydraulic wheel cylinder, the driving pawl 16, arm 17 and its abutment 20 are formed integral with one another, for example from spring steel strip, the spring loading being provided by a helical twist spring 21, the spring also being utilized to spring load the push rod 4 to urge the same to the retracted position.

As shown in FIGURES 1 to 3 of the drawings the helical twist spring has end portions 22, 23 which are bent so as to extend at right angles to one another the spring being assembled with the coils 24 disposed around the pivot pin 18 of the arm 17. The end 22 of the spring lies along the arm 17 with the tip of end 22 engaged in a slot 25 in the arm 17, the other end 23 of the spring 21 extends along a chord of the enlarged head 9 so that the spring load acts between the arm and the enlarged head. The end portion 23 is also curved for a part of its length, the curved portion embracing a curved edge 26 (FIGURE 2) of the bracket 19. In this arrangement the coils of the spring can be utilized as a compression spring applying a light load to the arm to bias the same and ensure that the pawl enters into proper engagement with a tooth of the ratchet wheel.

In the normal operation of the brake, the admission of hydraulic liquid to the hydraulic cylinder 1 causes outward movement of the piston 3 to apply the brake without any adjustment being effected. During mechanical operation, actuation of the hand brake lever results in sliding movement of the push rod 4 into the wheel cylinder, the thrust being transmitted through the sleeve and threaded rod of the adjusting device to the piston whereby the same is displaced mechanically to effect the brake application. During the inward movement of the thrust rod 4, the enlarged head 9 thereof engages the arm abutment 20 with the result that the arm 17 is turned against the spring action and the pawl 16 rides up the flank of an engaged tooth of the ratchet wheel 15. If the wear on the brake pads is sufficient, the turning movement of the arm will be such that the pawl will engage a further tooth, so that upon release of the hand brake lever the arm will return to its original position under the spring action, the pawl driving the ratchet wheel, the rotary movement thus imparted to the sleeve 10, causing inward axial movement of the threaded sleeve, by an amount corresponding to the brake pad wear. A holding pawl (not shown) is provided to hold the ratchet wheel against rotation during normal operation of the brake. If the brake pad wear is insufficient to necessitate adjustment, the driving pawl 16 will merely ride down the flank of the tooth with which it was originally engaged.

In the alternative form of construction shown in FIGURES 4 to 6 of the accompanying drawings, the adjusting device is also disposed within the interior of the hollow piston 28 of a hydraulic wheel cylinder 29, the cylinder being closed at one end by an end wall 30, the piston being assembled closed end outermost with seals 31 provided between the piston and cylinder bore. A push rod 32 for the mechanical actuation of the piston is slidably mounted in a guide bore 33 formed in the closed end 30 of the cylinder, a seal 34 preventing leakage of hydraulic liquid from the cylinder along the push rod. A flexible boot 35 is provided around the outer end of the push rod 32 to prevent the ingress of dirt to the cylinder interior. The outer end of the push rod is adapted to be operatively connected to the linkage of a hand brake mechanism and the inner end of the push rod has an enlarged head 36 which abuts the inner face of the end wall 30 of cylinder 29 when the push rod is fully retracted as shown in FIGURE 4.

The adjusting device includes a pair of members consisting of a sleeve 37 having a threaded bore which receives a correspondingly threaded rod 38. The sleeve and threaded rod are arranged in the interior of the piston and are axially supported as above described in connection with FIGURES 1 to 3 of the drawings. The end of the sleeve 37 adjacent the closed end of the piston 28 carries a ratchet wheel 39, the teeth of which are engageable by a driving pawl 40 disposed at one end of an arm 41 pivotally mounted on a tubular pivot 42. Pivot 42 is carried by a bracket 43 secured by bolts 44 to the inner face of the closed end wall 30 of the cylinder 29. The arm 41 extends parallel to the axis of the cylinder and the pivot 42 is arranged at right angles to said axis so that the arm is swingable in a plane parallel to the axis. Adjacent its pivoted end, the arm 41 has an abutment or stop 45 which is in the path of movement of the enlarged head 36 of the push rod 32 so as to be engaged thereby as the push rod slides inwardly, such engagement turning the arm in the clockwise direction (FIGURE 4), against spring loading, the action of which normally biasses the arm in the driving direction of the ratchet wheel. As in the previously described construction, the arm, pawl and abutment are formed integral with one another from spring steel strip. The spring loading of the arm 41 is provided by a torsion spring indicated generally by reference numeral 46. The torsion spring consists of a length of spring wire bent to provide two limbs 47 and 48 respectively, at right angles to one another, the spring when assembled having one limb 47 lying along the arm with the free end engaged in a slot 49 in the arm, the other limb 48 passing through the bore of the tubular pivot 42 and having its free end 50 cranked and bearing against a fixed stop 51 provided by a part of the bracket 43 and arranged so that the twist in the limb passing through the bore of the pivot 42 provides the spring action. In this particular arrangement a leaf spring 52 is provided to apply the light load to the arm to bias the same and ensure that the pawl enters into correct engagement with a tooth. Further, to facilitate assembly of the spring, the tubular pivot can be provided with a radial slot, not shown, which permits the limb of the spring to be assembled in the radial direction instead of threading the same through the bore. The operation of the adjuster is the same as that described in connection with the first embodiment.

In either of the forms of the invention described the push rod can be adapted for operation by any suitable mechanical arrangement actuated by the hand brake mechanism. In addition and if desired, stop means can be provided to determine a limit position for the sliding movement of the push rod in the direction for brake application. Such means may consist simply of a collar or shoulder surrounding the push rod which is engageable with a fixed abutment.

I claim:

1. An adjusting device for a brake comprising a cylinder open at one end, a piston disposed in the open end of said cylinder and having an open end facing the closed end of said cylinder, a push rod extending through the closed cylinder end and into said piston for moving the piston against a brake pad, an enlarged head on said rod adjacent said closed cylinder end for abutting said closed cylinder end when the piston is retracted, an internally threaded sleeve secured to said rod disposed within said cylinder and coaxially therewith, a threaded rod in said cylinder threaded into said sleeve and extending therefrom for acting against said piston, a ratchet wheel formed on said sleeve adjacent its end from which said threaded rod extends, an elongated pawl lever extending parallel to the cylinder axis and having one end adjacent to and adapted to engage the teeth of said ratchet wheel, bracket means secured to and disposed in said cylinder adjacent the closed cylinder end, pivot pin means secured to said bracket and disposed perpendicular to the axis of said push rod, sleeve and threaded rod, said pawl lever being pivotally connected to said pivot pin means to swing in a plane parallel to the axis of said push rod, sleeve and threaded rod, spring means having an axis coincident with the pivotal axis of said lever, stop means on another end of said lever adjacent said enlarged head and disposed for engagement by said enlarged head, one end of said spring means being disposed in an opening in the end of said lever adjacent said ratchet wheel, whereby said pawl lever is pivoted by movement of said push rod and head toward a braking position to engage the next adjacent tooth in the ratchet wheel, and upon retraction from a braking position to rotate the ratchet wheel to cause relative movement of the sleeve inwardly to adjust for brake wear.

2. The device of claim 1 wherein said spring means is a coiled helic spring wrapped around said pivot pin means.

3. The device of claim 1 wherein said spring means are disposed to provide spring loading on said push rod to maintain it in a normally retracted position.

4. The device of claim 1 wherein said pivot pin means is tubular and said spring means is a torsion spring.

5. The device of claim 1 wherein said pawl lever is made of a steel spring strip.

References Cited in the file of this patent

UNITED STATES PATENTS

| | | |
|---|---|---|
| 2,160,859 | Grayson | June 6, 1939 |
| 2,224,197 | Schlueter | Dec. 10, 1940 |
| 2,669,327 | Chamberlain et al. | Feb. 16, 1954 |
| 2,820,530 | Chouings et al. | Jan. 21, 1958 |